April 28, 1970  W. H. COOK  3,508,669
STORAGE FACILITY FOR PIPES AND SIMILAR ARTICLES
Filed Feb. 12, 1969  4 Sheets-Sheet 3
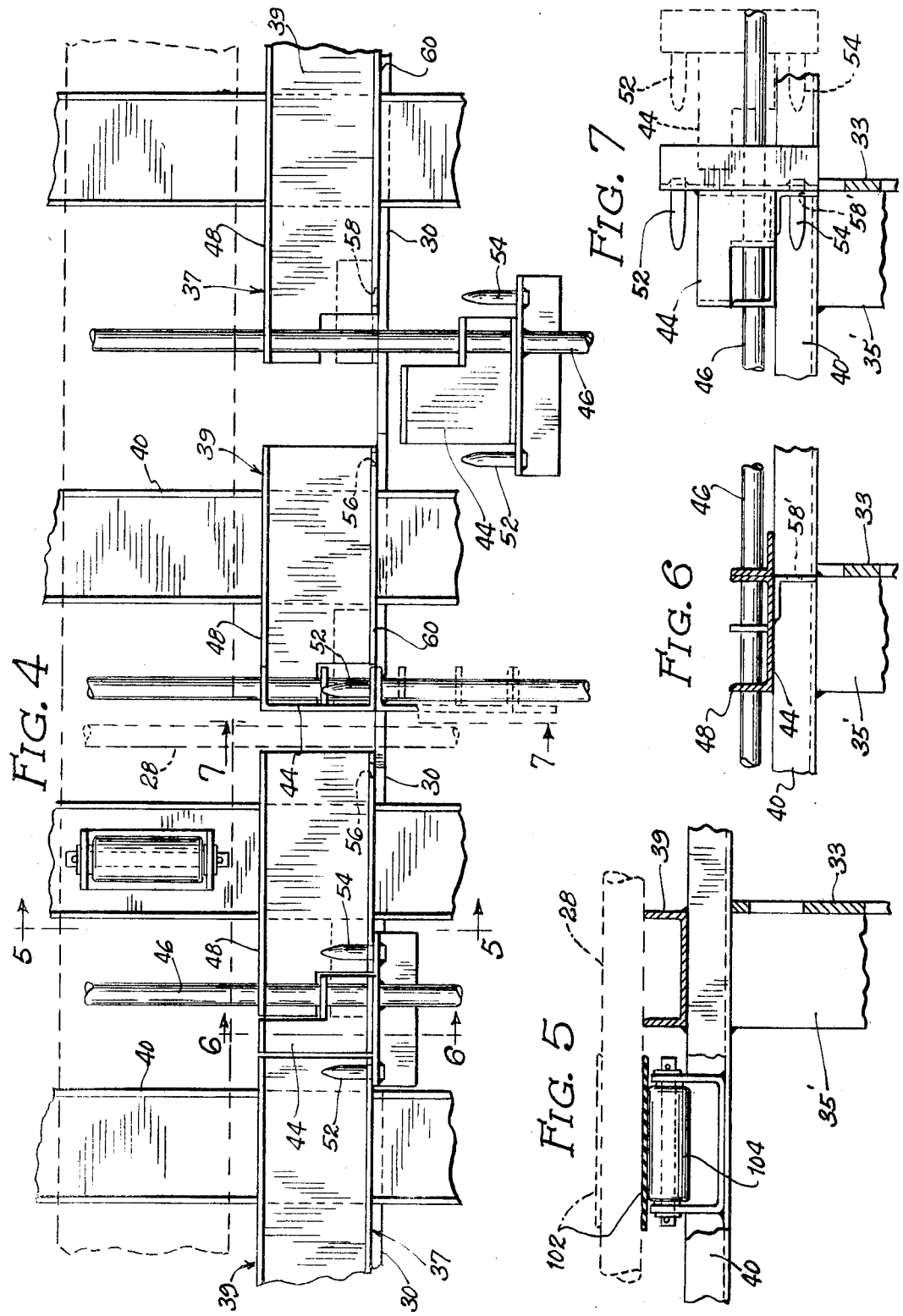

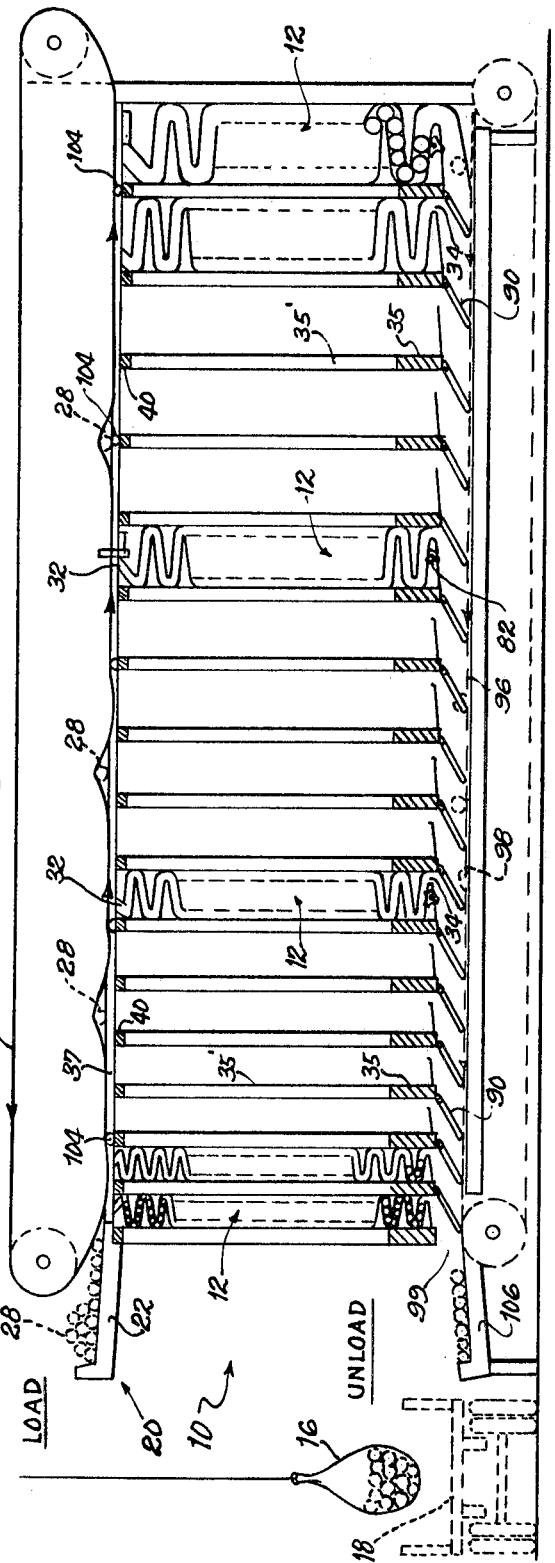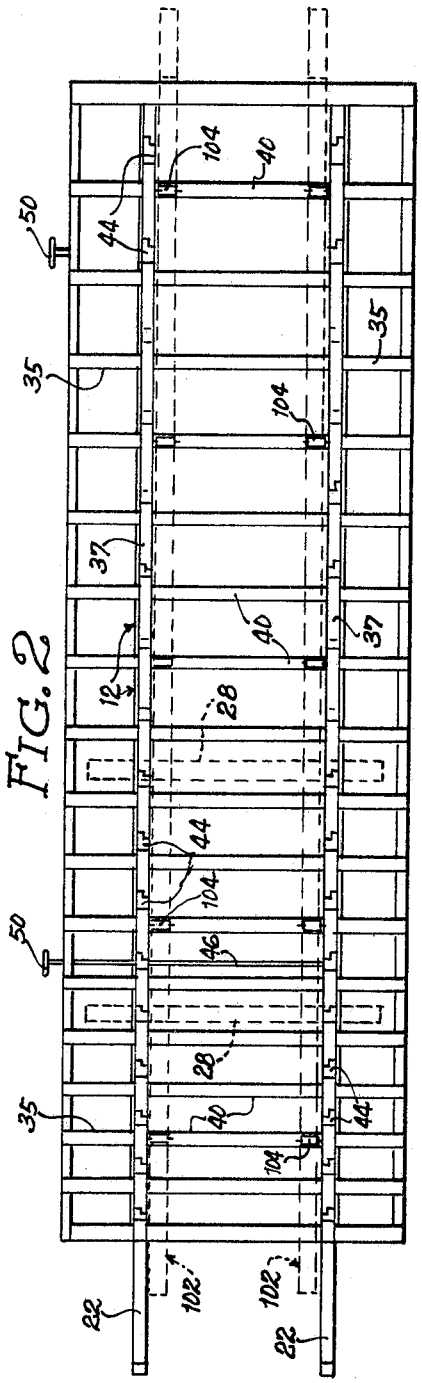

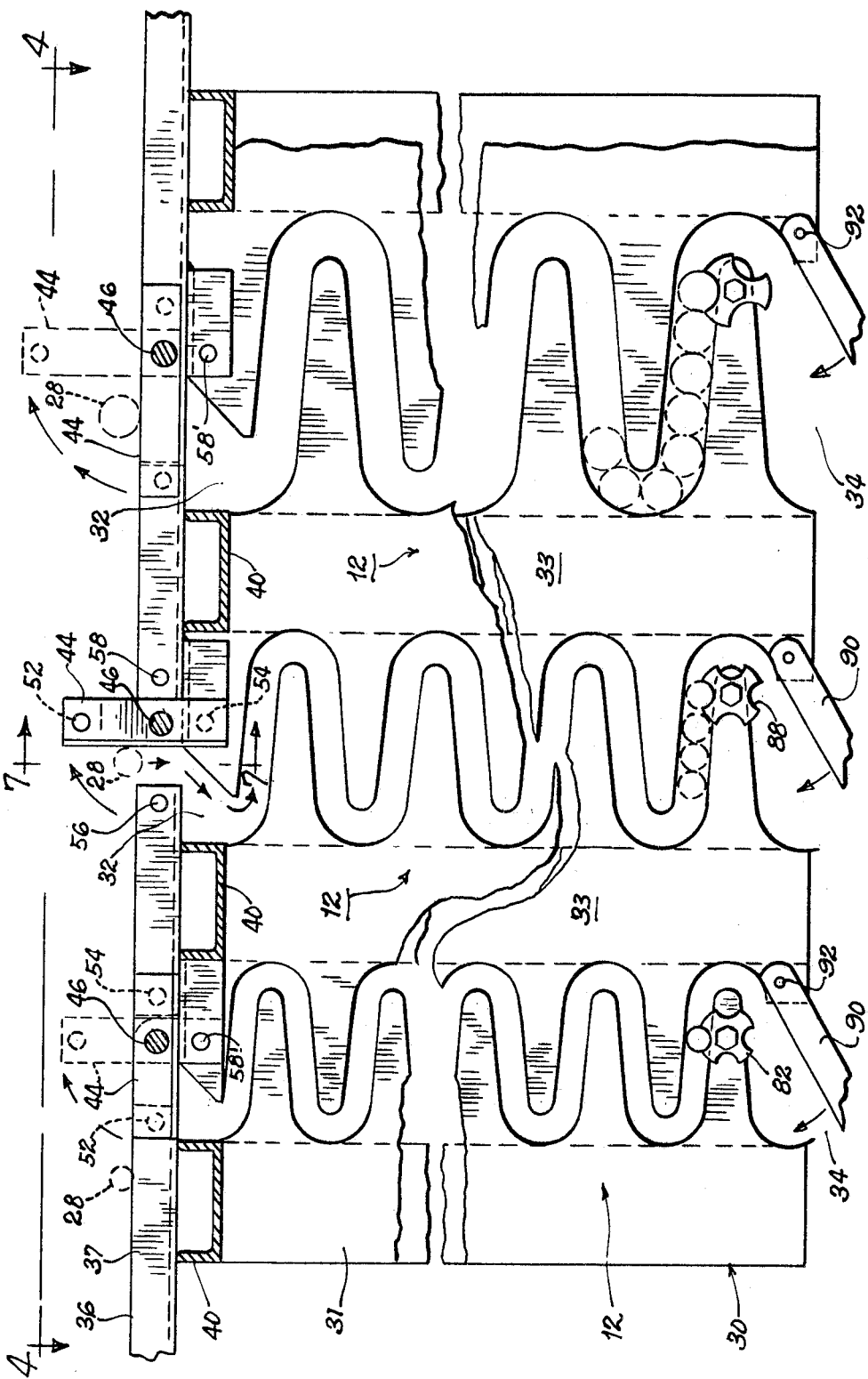

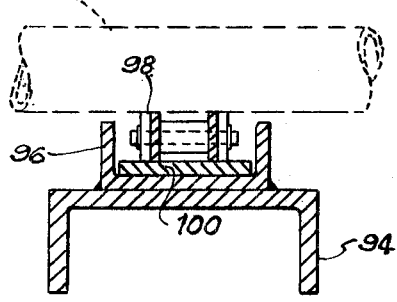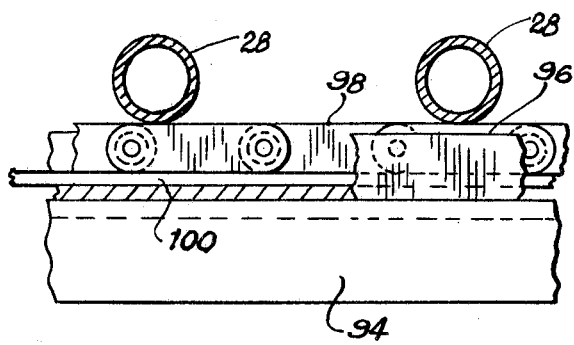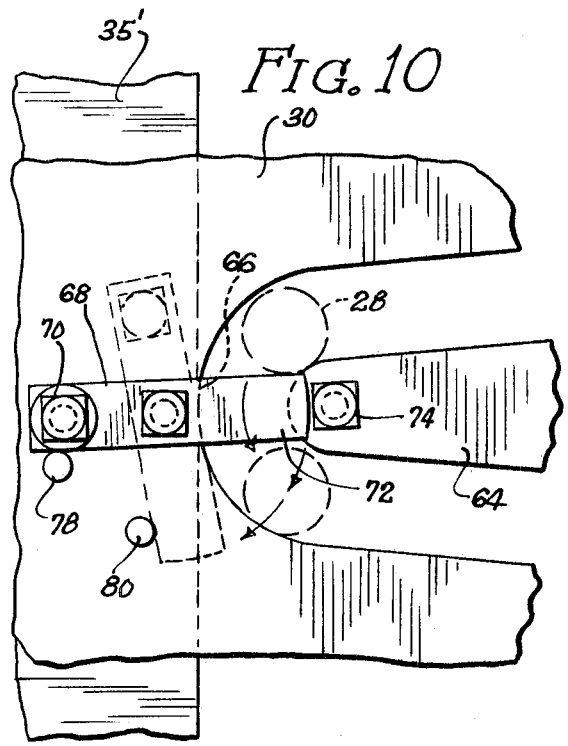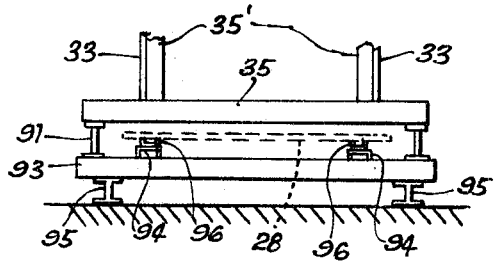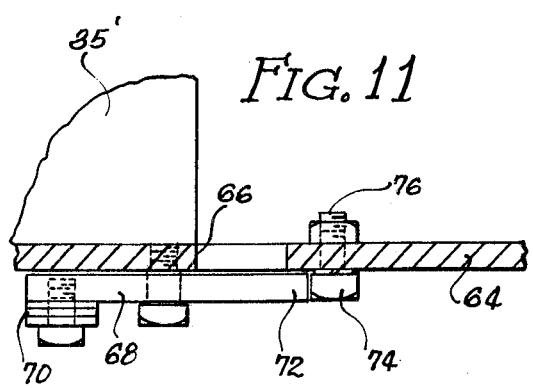

United States Patent Office 3,508,669
Patented Apr. 28, 1970

3,508,669
STORAGE FACILITY FOR PIPES AND
SIMILAR ARTICLES
William H. Cook, 2738 N. Pinegrove,
Chicago, Ill. 60614
Continuation-in-part of application Ser. No. 635,756,
May 3, 1967. This application Feb. 12, 1969, Ser.
No. 798,751
Int. Cl. B65g 47/00
U.S. Cl. 214—16                                    13 Claims

ABSTRACT OF THE DISCLOSURE

A storage facility for holding pipes or the like in separate bins whereby the pipes can be selectively removed from the bins for shipment or use. The facility is provided with an upper ramp which is employed for directing the pipes to entrances for the respective bins which are formed of spaced apart members defining downwardly extending sinuous paths. Means are provided for selectively opening the bins whereby pipes of certain characteristics can be stored in the proper bin, and these same means lock and unlock lateral support elements which extend between the bins. The first pipes introduced into the bins will immediately move toward exits for the bins whereby a "first in-first out" operation is achieved. The pipes move under the influence of gravity or through the use of conveyors whereby a minimum amount of handling is required.

---

This application is a continuation-in-part of applicant's copending application Ser. No. 635,756, filed May 3, 1967 now abandoned.

This invention relates to a facility for the storing of pipes, tubes and rods or similar articles. The facility is primarily designed for use in conjunction with elongated articles having a circular or nearly circular cross section whereby the articles will roll under the influence of gravity during placement in the facility and during removal from the facility.

The instant invention will be described with reference to the handling of pipes, for example, pipes of the type maintained by a distributor of plumbing supplies. It will be understood that references throughout this specification to such an operation are provided solely for purposes of illustration. Tubes, rods and other elongated articles suitable for numerous applications are maintained by a wide variety of businesses or other operations and car readily be used in conjunction with the construction of this invention.

A distributor of plumbing supplies must maintain an inventory which includes a variety of different pipe sizes. These pipes are usually delivered to the distributor in bulk and placed in storage bins. The distributor will then selectively remove pipes of various sizes in order to fill orders.

The usual storage facility may comprise a plurality of bins, each of which stores pipe of a different size. When pipe is placed in such bins, the last pipe stored is always the most accessible. Thus, if the pipe is removed from the top of the bin, the last pipe stored will be exposed. If the bins are similar to shelves, the ends of all pipe in the bins will be exposed; however, it is difficult or impossible to remove the older pipe because of the weight of newly stored pipe piled on top of the older pipe.

Since it is desirable to remove older pipe from inventory before newer pipe, techniques have been developed to alleviate the problems referred to. In some instances, two bins may be provided for each pipe size. After a certain amount of pipe is in one bin. All new pipe will be stored in the other bin, and pipe will be removed only from the older supply. This arrangement has disadvantages, however, in that a considerable amount of space remains inactive for certain periods, and this reduces storage efficiency.

Other operations involve periodic moving of pipe in bins whereby the older material can be shifted to upper positions. This involves a great amount of expense, particularly from a labor standpoint. A technique of this type also makes it impractical to store pipe to any great depth since the weight would make it extremely difficult to undertake any shifting of the lowermost pieces in a pile.

A primary object of this invention involves the provision of storage facilities for pipes, tubes, rods and similar articles whereby the articles can be removed from the facilities on an absolute "first in-first out" basis.

It is a further object of this invention to provide a storage facility which permits maximum utilization of space available for storage thereby greatly increasing the efficiency of the facility.

These and other objects of this invention will appear hereinafter and for purposes of illustration, but not of limitation, specific embodiments of the invention are shown in the accompanying drawings in which:

FIGURE 1 is a sectional elevation of a pipe storage facility characterized by the features of this invention;

FIGURE 2 is a plan view of the storage facility shown in FIGURE 1;

FIGURE 3 is an enlarged, fragmentary sectional view illustrating inlet and outlet areas of the facility;

FIGURE 4 is a plan view taken about the line 4—4 of FIGURE 3;

FIGURE 5 is a fragmentary, sectional view taken about the line 5—5 of FIGURE 4;

FIGURE 6 is a fragmentary, sectional view taken about the line 6—6 of FIGURE 4;

FIGURE 7 is a fragmentary, sectional view taken about the line 7—7 of FIGURES 3 and 4;

FIGURE 8 is a fragmentary, cross-sectional view illustrating a portion of the lower ramp;

FIGURE 9 is a fragmentary, side elevation of the ramp portion shown in FIGURE 8;

FIGURE 10 is a detail view illustrating a pivotal support means which may be located at intermediate levels of the facility;

FIGURE 11 is a horizontal, sectional view illustrating the pivotal support shown in FIGURE 10; and FIGURE 12 is a reduced sectional, elevation illustrating the supporting structure for the facility.

The storage facility of this invention consists of an upper delivery ramp over which articles to be stored, such as pipe, are moved. Storage bins are located beneath the upper ramp, and a plurality of entrance openings are provided for access to the bins. The pipe is adapted to be selectively directed to these entrance openings for movement into the bins.

The pipe carrying surfaces of the bins are designed so that the pipes are carried by gravity toward the ends of the bins. Means are provided at the end of each bin for removing the pipes, preferably one at a time.

The bins are designed to load pipe of different sizes whereby an order for pipe of varied sizes can be filled by removing desired amounts from different bins. It will be apparent, however, that pipes of the same size may be stored in different bins, particularly if a large amount of one size is required or if pipes of different grade are carried in the inventory.

In the preferred form of the invention, the storage bins are located adjacent loading and unloading areas. With this arrangement, pipe can be removed from a truck or other carrier which is positioned in an area alongside the bins, and the pipe is then carried to the upper ramp. The bins are preferably designed so that pipe which is removed will be moved to this same area whereby pipe for filling an order can be loaded on a truck or other carrier positioned at the same location as carriers used for delivering the pipe.

The facility shown in the accompanying drawings consists of a loading and unloading area 10 with a plurality of bins 12 situated adjacent the loading area. An overhead crane including a sling 16 is provided for removing pipe from a carrier such as the truck 18.

A loading platform 20 comprising a pair of arms 22 is provided for supporting pipe lengths 28. It will be apparent that the crane can pick up pipe from the truck bed, and then place the pipe on the arms 22.

Each of the storage bins 12 is formed by means of opposed upstanding side walls 30. Cut-out portions of the side walls define a sinuous path from entry ends 32 to exit ends 34. The upper edges 36 of rails 37 mounted on the side walls provide a ramp for supporting pipe moving from the arms 22 to the entry ends 32. In the arrangement shown, the pipe is supported between two walls 30, however, additional walls can be included where the length and weight of the pipe require this. For example, long, small diameter pipe will bow unless some intermediate support is provided.

The walls 30 may be produced from plate stock, and cutting torches may be utilized for providing the specific design of these walls. With reference to FIGURE 3, it will be noted that the walls are actually composed of individual sections 33 having outwardly extending fingers 64 with the fingers of one section interleaving with the fingers of an adjacent section. An end wall section may be of the type 31 shown at the left-hand side of FIGURE 3 wherein the fingers extend outwardly from only one side. Intermediate sections 33 may have fingers extending from both sides. In any case, the sections are connected at the top to transverse beams 40, and at the bottom to transverse beams 35. The sections 33 are also fastened to columns 35' located between the transverse members 35 and 40 to provide additional support.

As best shown in FIGURE 12, the beams 35 are supported on longitudinal beams 91 which in turn support transverse beams 93, the latter supporting lower rails 94, 96. The beams 93 are supported on the ground or floor by beams 95.

As best shown in FIGURES 3, 4 and 5, the upper rails 37 comprise U-shaped channels. The channels comprise individual sections 39 which are welded or otherwise secured to the transversely extending beams 40. The adjacent rail sections 39 are interconnected by means of additional rail sections 44. As best illustrated in FIGURE 4, the sections 44 may be cut directly from the same piece that forms the rail 37.

The rail sections 44 are welded to transversely extending rods 46, and these rods extend through openings defined in the side walls 48 of the rails 37. The rods extend beyond the side walls of the facility, and a handle 50 may be provided at the end of each rod (FIGURE 2). By means of the handle 50, the rods can be pushed or pulled to move the sections 44 in and out of alignment with the rail sections 39. In addition, rotation of the rods through 90° will locate the sections 44 in the dotted line position shown in FIGURE 4, and inward movement of the sections will position the sections as best shown in FIGURES 3 and 7 to provide an access opening for introduction of pipe into the associated bin.

To provide for locking of the sections 44 relative to the sections 39, a pair of pins 52 and 54 are attached to the sections 44. Corresponding openings 56 and 58 are defined by the walls 60 of the sections 39. When the section 44 is horizontally disposed as shown at the left side of FIGURE 4, then both pins are received in the openings to provide a substantially continuous rail surface. When the sections 44 are pivoted as shown in FIGURE 7, then the pin 54 is in position to be received by the opening 58' so that the sections 44 can be locked in the open position.

When pipe is to be introduced into a particular bin, the operator will lock the section 44 for that bin in the upright position while all of the other sections remain in the horizontal position. The pipe is then placed on the upper ramp and moved over the rails 37 until the section 44 which is in the upright position is encountered, at which time the pipe will drop into the associated bin. The pipe will then move along the sinuous path until it reaches the bottom of the bin or until it moves against another pipe in the bin.

It will be appreciated that the sections 44 have a multiple function in that they serve as rail members when in the closed position, while also serving as gates in the upright position. When positioned to serve as gates, these sections also prevent the pipe from moving past the designated bin by serving as barriers.

The sections 44 also provide an additional extremely important function. It has been found that loading of pipe in bins in the manner described sets up extreme forces along the length of the facility. The pipe sets up forces in the plane of each wall 30 whereby the wall sections will tend to move away from each other. The sections 44, because of the interlocking pins, serve to tie the adjacent walls together. The interconnection provided by these sections 44 is broken when pipe is to be introduced into a particular bin; however, all of the other sections 44 remain locked in the horizontal position at this time to provide the necessary stability.

FIGURES 10 and 11 illustrate an additional arrangement which may be incorporated in the construction to prevent relative movement of the wall sections in response to the high pressures developed when the bins are partially or completely filled. Under some conditions, the fingers 64 of one wall section tend to move against the opposing surface 66 of an adjacent wall section. To counteract this, a pivotally mounted bar 68 is attached to the wall 30. A counterweight 70 is secured at one end of the bar, and the opposite end 72 is normally positioned adjacent the head 74 of a bolt 76 which is secured to the finger 64. If forces are developed which would tend to move the finger toward the surface 66, then the bar 68 will maintain the desired spaced relationship. Because the bar is pivotally mounted, however, a pipe introduced into the bin will move the bar out of position so that the bar will not block the path. Stop pins 78 and 80 are secured to the wall 30 to limit the movement of the bar. Counterweight operates to keep the bar in the normal position until it is moved through engagement with a pipe. The bars 68 may be located at intervals in all of the bins or they may be utilized in selected areas of high pressure concentration.

When a pipe has moved to the bottom of a bin, it moves into engagement with dispensing wheels 82. These wheels are mounted on a common shaft 84 extending across the bottom of each bin and a handle 86 is provided for rotating the shaft. Semi-circular cut-outs 88 are defined by each wheel with the size of the cut-outs being selected, depending upon the diameter of the pipe to be stored in a particular bin. When an attendant wishes to remove a pipe, the wheels are rotated until the pipe drops down, and pipe can be removed one at a time so that the attendant can secure exactly the correct amount. It will be appreciated that as soon as a pipe is removed, the next pipe will feed into a cut-out and thus be available for the next removal operation.

Although handles are illustrated for operation of the rail sections 44 and dispensing wheels 82, it will be appreciated that automatic controls could easily be designed for these elements. Thus, the reciprocal and pivoting action of the sections 44 and the rotary movement of the wheels 82 is relatively simple, and suitable drive means could be developed for these purposes.

When a pipe is released by the wheels 82, the pipe will fall into engagement with inclined ramp elements 90. These elements provide support for the pipe as it rolls onto the lower track. This avoids the possibility of damage to the construction or to the pipe as might occur if the pipe were to fall free onto the track.

The elements 90 are pivotally connected at 92, and these elements will, therefore, swing upwardly in response to engagement by a pipe moving along the lower track. This arrangement also provides a means for maintaining alignment of the pipe as it moves along the lower track.

FIGURES 8 and 9 illustrate a suitable arrangement for the lower track. This arrangement includes a longitudinally disposed support 94 having channel member 96 secured thereto. A conveyor chain 98 of conventional design is located within the channel 96, and this chain is driven to move in the direction of the exit end 99. A replaceable wear strip 100 may be interposed between the chain and the bottom surface of the channel to avoid the necessity for replacing the channel.

The chain 98 may have fingers or some other means for engaging the pipe and thereby carrying the pipe toward the exit end. On the other hand, the mere movement of the conveyor chain is sufficient to keep the pipe moving toward the exit end without the use of any additional gripping means.

FIGURES 1 and 5 illustrate a suitable arrangement for moving pipe to be loaded from the loading platform to the bins. This arrangement comprises a pair of belts 102 with the lower flight of the belts sagging downwardly into engagement with the rails 37. The arms 22 of the loading platform are slightly inclined so that pipe on the platform will be urged into engagement with the lower flight of the belt. Because of the sagging condition of the belt, the pipe will be embraced by the belt and thereby carried along with the belt until encountering a rail section 44 in the open position. A plurality of idler rollers 104 may be located at spaced intervals along the path of movement of each belt to facilitate this operation.

It will be appreciated that the belts 102 will actually tend to restrain the pipe on the upper track particularly if the track is downwardly inclined. An incline may also be utilized for the bottom track although it is not desirable to generate undue momentum in the pipe.

In the embodiment illustrated, the exit end 99 is located at the same end of the facility as the loading platform. With this arrangement, the pipe removed from the bins will collect on the arms 106 for loading onto a truck or other carrier by means of the same crane used for loading the bins. It will be appreciated, however, that the exit end can be readily located at the opposite end of the construction by reversing the position of the elements 90 and the movement of the chain 98, and by making appropriate adjustments at the outlet of the bins.

The embodiment illustrated provides for location of the bins on only one side of the loading and unloading area. It will be apparent, however, that bins on both sides of this area could be readily provided. Furthermore, assemblies of bins could be situated in side-by-side relationship. A traveling crane, or a plurality of such cranes could be designed for movement up and down the rows of bins.

The storage facility proves to be extremely efficient primarily because of the "first in-first out" characteristics. It should also be noted that the arrangement is also extremely efficient from the standpoint of maximum utilization of space. The bins can be constructed whereby the assembly will have a large vertical height, and all of the volume can be utilized except for the material dividing the levels of the bins. This is much more efficient than shelves or other standard bins since the vertical height of a pile of pipe is limited in all such arrangements because of the weight which prevents removal of pipe from a large pile. Furthermore, great vertical heights are not achieved in standard operations due to the fact that the pipe stored at the bottom of such piles becomes so old or so inaccessible that it would have no value. The arrangements of this invention are also obviously superior to the provision of dual facilities for the same size pipe.

The construction of this invention is also highly efficient due to the fact that a minimum amount of labor is required for the loading and unloading operations. A single operator can handle the crane operation as well as control of the entry gates and exit feeding means. This is particularly true where the drive mechanisms for operating the gates are automatically driven since they can then be operated from a control panel along with the crane. The operator can place a load of a certain size on the loading platform and then push the necessary button to open the desired gate whereby the pipe will automatically roll into the desired bin. A similar control system can be utilized to operate the mechanisms which discharge the pipe.

The construction shown is also very convenient when making an inventory of pipe on hand. Since the sides of the bins can be exposed, at least at intervals, the level of pipe stored in a particular bin can be determined on sight. The bins can be easily marked so that the number of pipes in a particular bin can be readily determined by reading the marking at the level to which the bin is filled.

It will be understood that various changes and modifications may be made in the construction described which provide the characteristics of this invention without departing from the spirit thereof particularly as defined in the following claims.

That which is claimed is:

1. A storage facility for a plurality of articles such as pipes and rods comprising a loading platform, an upper delivery ramp extending away from said platform, separate storage bins located beneath said ramp, said bins extending vertically in side-by-side relationship beneath said upper ramp, article supporting means for said bins comprising at least two spaced apart plate members, the spacing between said plate members being less than the length of the articles to be stored, openings formed in said plate members defining downwardly extending sinuous paths, said openings defining lower edge portions which provide supporting surfaces for said articles with the opposite ends of said articles extending outwardly beyond said openings, a plurality of gates in said ramp, means mounted adjacent the upper portion of adjacent plate members and operatively associated with said gates serving to tie adjacent plate members together when the gates are in the closed position, means for laterally and pivotally moving said gates to provide entrances into said bins, outlets at the bottom of said bins, an unloading platform, and means for moving said articles from said outlets to said unloading platform.

2. An apparatus in accordance with claim 1 comprising rails extending over said upper ramp for carrying the articles to said gates, said gates comprising continuations of said rails whereby the articles will ride over gates in the closed position.

3. An apparatus in accordance with claim 2 wherein said gates include laterally extending pins, openings defined by rail sections situated on opposite sides of each gate for receiving said pins, said pins being received by openings on both sides when in the closed position and on one side in the open position, said gates in the open position thus being secured to serve as stop means for articles moving along the upper ramp.

4. An apparatus in accordance with claim 1 comprising a lower ramp extending toward said unloading platform, said outlets communicating with said lower ramp.

5. An apparatus in accordance with claim 4 including dispensing means at said outlets for selectively dispensing articles from said bins.

6. An apparatus in accordance with claim 5 including restraining means located adjacent said dispensing means for guiding and supporting articles passing from the dispensing means, a lower ramp for receiving said articles, said restraining means normally extending into the path of movement of articles on said lower ramp, and wherein the restraining means are pivotally mounted whereby articles moving down the ramp are slowed by the restraining means and are adapted to push the restraining means out of the way for continued movement of the articles along said lower ramp.

7. An apparatus in accordance with claim 6 including conveyor means movable along the lower ramp for transporting articles toward said unloading platform.

8. An apparatus in accordance with claim 1 including conveyor means for transporting articles along said upper ramp.

9. A storage facility for a plurality of articles such as pipes and rods comprising a loading platform, an upper delivery ramp extending away from said platform, separate storage bins located beneath said ramp, said bins extending vertically in side-by-side relationship beneath said upper ramp, article supporting means for said bins comprising at least two spaced apart plate members, the spacing between said plate members being less than the length of the articles to be stored, each of said plate members being formed from a plurality of unconnected sections, openings formed between adjacent sections of the plate members, said openings defining downwardly extending sinuous paths with lower edge portions thereof providing supporting surfaces for said articles, the opposite ends of said articles extending outwardly beyond said openings, a plurality of gates associated with said upper ramp and providing entrance into said bins, a plurality of spaced brace means extending between said sections for preventing relative movement of the sections in response to forces developed by the weight of articles located in the bins, means for moving at least one of said brace means out of a bracing position in response to the movement of articles in the bin to permit movement of articles in the bin, means to restore said brace means when the articles have moved past the brace means, outlets at the bottom of said bins, an unloading platform, and means for moving said articles from said outlets to said unloading platform.

10. An apparatus in accordance with claim 9 wherein said gates provide one of said brace means, said gates including means for releasably connecting adjacent sections to hold said sections against movement relative to each other.

11. An apparatus in accordance with claim 9 wherein said brace means comprise brace members located intermediate the inlet and outlet ends of said bins, said brace members extending across the openings provided for passage of said articles to hold adjacent sections against relative movement, and wherein engagement of said articles with said brace members during movement through said bins operates to push the brace members out of the path of the articles, and including means for restoring said brace members after the articles have moved past the brace members.

12. A storage facility for a plurality of articles such as pipes and rods comprising a loading platform, an unloading platform, an area adjacent the unloading platform where constructions for carrying articles can be positioned, means for removing articles from the carrier for placement on said loading platform, and for removing articles from the unloading platform for placement on said carrier, an upper delivery ramp extending away from said loading platform, separate storage bins located beneath said ramp, said bins extending vertically in side-by-side relationship beneath said upper ramp, article supporting means for said bins comprising at least two spaced apart plate members, the spacing between said plate members being less than the length of the articles to be stored, openings formed in said plate members defining downwardly extending sinuous paths, said openings defining lower edge portions which provide supporting surfaces for said articles with the opposite ends of said articles extending outwardly beyond said openings, a plurality of inlets in said ramp providing entrances for said bins, outlets at the bottom of said bins, dispensing means at said outlets for selectively dispensing articles from said bins, restraining means located adjacent said dispensing means for guiding and supporting articles passing from the dipensing means, a lower ramp for receiving said articles, said restraining means normally extending into the path of movement of articles on said lower ramp, and wherein the restraining means are pivotally mounted whereby articles moving down the ramp are slowed by the restraining means and are adapted to push the restraining means out of the way for continued movement of the articles along said lower ramp.

13. A storage facility for a plurality of articles such as pipes and rods comprising a loading platform, an upper delivery ramp extending away from said platform, separate storage bins located beneath said ramp, said bins extending vertically in side-by-side relationship beneath said upper ramp, article supporting means for said bins comprising at least two spaced apart plate members, the spacing between said plate members being less than the length of the articles to be stored, openings formed in said plate members defining downwardly extending sinuous paths, said openings defining lower edge portions which provide supporting surfaces for said articles with the opposite ends of said articles extending outwardly beyond said openings, a plurality of gates in said ramp, means mounted adjacent the upper portion of adjacent plate members and operatively associated with said gates serving to tie adjacent plate members together when the gates are in the closed position, means for opening said gates to provide entrances into said bins, outlets at the bottom of said bins, an unloading platform, means for moving said articles from said outlets to said unloading platform, and including conveyor means for transporting articles along said upper ramp, said conveyor means comprising at least one belt having a lower flight extending over the surface of said upper delivery ramp, said belt sagging downwardly into contact with said surface whereby articles moved onto said surface are embraced by portions of the belt for movement with the belt along said surface.

References Cited

UNITED STATES PATENTS

| | | | |
|---|---|---|---|
| 699,690 | 5/1902 | Leetham | 214—16 |
| 1,510,055 | 9/1924 | Haldeman | 214—16 |
| 1,802,546 | 4/1931 | Albertoli | 214—16 |
| 2,969,883 | 1/1961 | Cargill et al. | 214—16 |

FOREIGN PATENTS 776,832    6/1957    Great Britain.

GERALD M. FORLENZA, Primary Examiner
R. B. JOHNSON, Assistant Examiner

U.S. Cl. X.R.

193—27, 40; 198—168